(No Model.)
E. G. N. SALENIUS.
METHOD OF SEPARATING BUTTER FROM UNSKIMMED MILK OR CREAM AND APPARATUS FOR CARRYING OUT THE SAME.
No. 448,373. Patented Mar. 17, 1891.
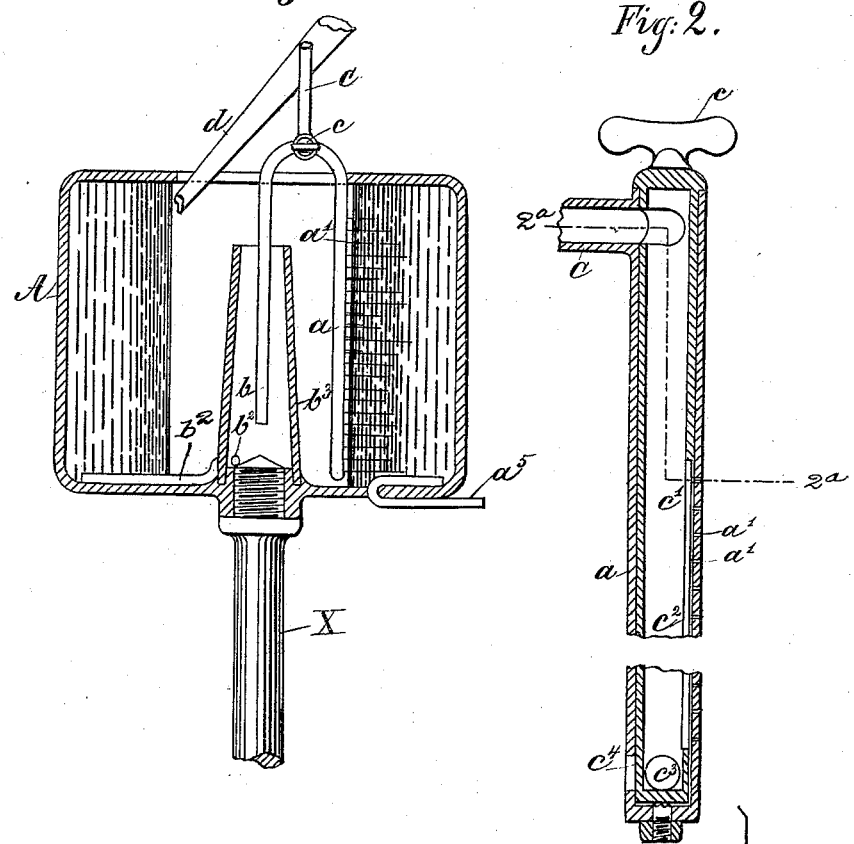

(No Model.) 2 Sheets—Sheet 2.
E. G. N. SALENIUS.
METHOD OF SEPARATING BUTTER FROM UNSKIMMED MILK OR CREAM AND APPARATUS FOR CARRYING OUT THE SAME.

No. 448,373. Patented Mar. 17, 1891.

Witnesses:
Inventor:

UNITED STATES PATENT OFFICE.

ERIK GUSTAF NICOLAUS SALENIUS, OF STOCKHOLM, SWEDEN.

METHOD OF SEPARATING BUTTER FROM UNSKIMMED MILK OR CREAM AND APPARATUS FOR CARRYING OUT THE SAME.

SPECIFICATION forming part of Letters Patent No. 448,373, dated March 17, 1891.

Application filed July 26, 1890. Serial No. 359,998. (No model.)

*To all whom it may concern:*

Be it known that I, ERIK GUSTAF NICOLAUS SALENIUS, a subject of the King of Sweden, residing at Stockholm, Sweden, have invented certain Improvements in Methods of Separating Butter from Unskimmed Milk or Cream and in Apparatus for Carrying Out the Same, of which the following is a specification.

My invention relates to improvements in the art of separating butter from unskimmed milk or cream; and the object of my invention is in part to improve and simplify the procedure and in part to provide new and improved apparatus for carrying my new process into practice.

My improved process consists, essentially, in directing upon and against the wall of cream in a rapidly-rotating drum a jet or jets or spray of some fluid or liquid, as air, blue milk, water, &c., whereby the cream is whipped or lashed in such a manner as to liberate the particles of blue milk mixed with the butter particles and to cause the latter to cohere and form a butter mass, which may be removed by means of a skimming-pipe or the like. The blue milk thrown out by the centrifugal force flows away at an outlet provided for it.

My process may be carried out in a continuous manner or the milk and cream may be treated in successive portions or instalments. I prefer the former or continuous mode. Any suitable fluid or liquid may be used to stir or whip up the cream-wall in the separating-cylinder; but I prefer to use for this purpose the skimmed or blue milk, which may, if convenient, be supplied under pressure either from a pump or press, or even from an ordinary cream-separator. In this latter case, however, I prefer to use also the separator cream in the butter-separating cylinder of my apparatus.

In the accompanying drawings I have illustrated several forms of apparatus embodying my improvements and adapted for use in carrying out my new process.

Figure 3:
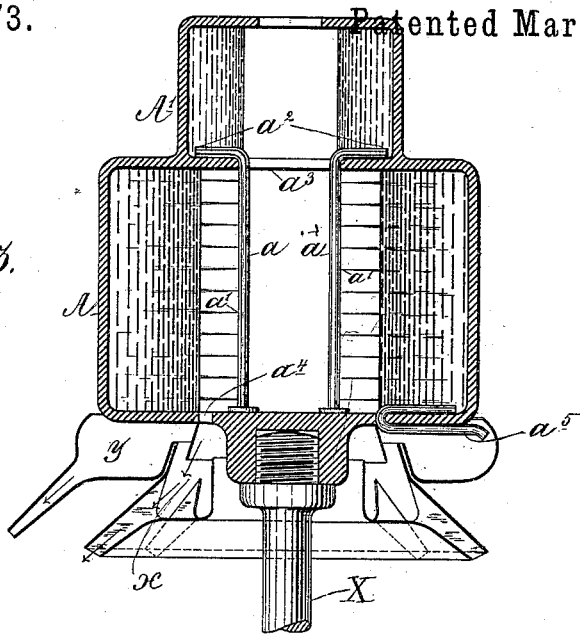
Figure 4:
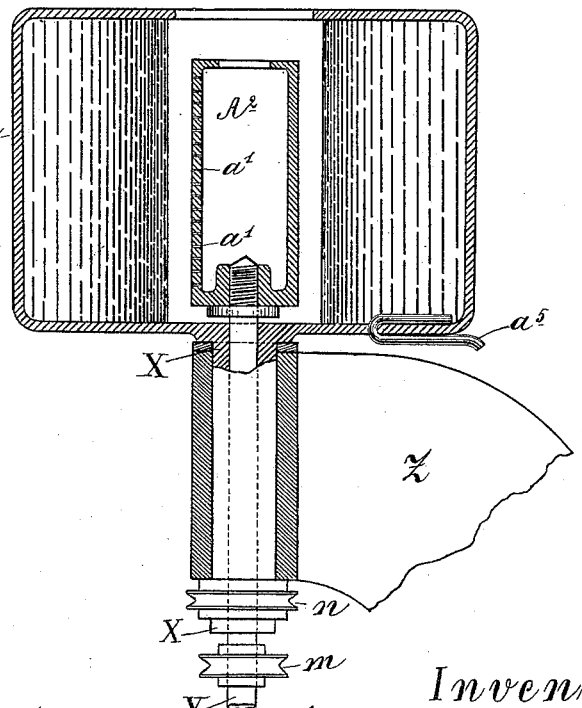

In said drawings, Figure 1 is a vertical mid-section of one of the forms of my apparatus, and Fig. 2 is a sectional detail of a slightly-different construction of the supply-pipe of the same. Fig. $2^a$ is a horizontal cross-section of the modified construction illustrated in Fig. 2, the plane of the section being indicated by the dotted line $2^a$ $2^a$ in Fig. 2. Fig. 3 is a vertical mid-section of a somewhat different construction of my apparatus, in which is illustrated the preferred form of the same, wherein is combined the cream-separator and butter-separator mounted on and driven from one and the same shaft. Fig. 4 is a vertical mid-section similar to Fig. 1, but illustrating a construction somewhat different from either of the preceding.

Referring first to Fig. 1, A is the wall of the separating cylinder or drum, and X is the main driving-shaft of the same. C is the supply-tube for the milk, which is branched at its lower end, the two branches $a$ and $b$ entering the separating-drum A. This supply-tube is provided at the junction of its branches with a three-way gate or cock $c$, the object of which I will now explain. If it is desired to feed the cream and blue milk separately from a cream-separator to the apparatus, the cream from the separator is first passed through the pipe C, the cock $c$ being turned so as to close or cut off the branch $a$ and opening the branch $b$ to the flow of the cream. The cream flows from the branch $b$ down into a tapered annular chamber $b^3$, from the bottom or lower part of which it flows by way of the tube $b^2$, which opens into said chamber $b^3$ near its base, to the outer part of the separating-chamber near the wall A of the same. As soon as said separating-chamber shall have been properly filled with the separator cream, the apparatus being in rapid rotary motion, the cock $c$ is again turned, and the flow of the separator cream through the tube C cut off. The blue milk from the separator is now turned into the pipe C, and the cock $c$ is set so as to open the branch $a$ thereof to its flow. In the outer side of this branch $a$, or that side nearest the forming cream-wall in the separating-chamber, is formed a series of small jet-apertures $a'$, from which the blue milk under pressure from the cream-separator sprays in fine and energetic jets against the cream-wall in the rapidly-rotating drum A. These jets act on the butter globules in said cream-wall to stir or whip them together and cause them to coalesce and form still another and inner stratum of pure butter, which may be removed by means of a skimming-pipe $d$ or the like.

In Fig. 2 is shown a slight variation from the construction illustrated in Fig. 1, wherein the supply-tube C is not branched at its lower end where it enters the chamber A, but is provided with a continuation $a$ bent at right angles to the main tube C and formed in the nature of a long cock. In this construction the gate $c'$ of the cock $c$ is made also in the form of a tube, open at its upper end or mouth to the tube C, and provided at its lower end with an aperture $c^3$ in one of its sides, which registers, when the cock is properly set, with an aperture $c^4$ in the outer wall of the cock, (the tube $a$.) On its other face or side the tube $c'$ is slitted longitudinally at $c^2$, which slit $c^2$ registers in turn, when the cock is properly set, with a series of small jet-apertures $a'$, formed in the face of the tube $a$, similar to those of the construction seen in Fig. 1. Thus it will be seen that either the separator cream or blue milk may be turned into the drum A of the butter-separator, the cock $c$ being turned in the case of cream so as to open the passage through the apertures $c^3$ and $c^4$, and in the case of the blue milk so as to open the jet apertures $a'$ to the flow of the milk.

In Fig. 3 I have shown a form of my apparatus wherein the cream-separator and butter-separator are combined in one apparatus or machine, which I will now describe. A' is the drum of the cream-separator, which is formed in one with the butter-separating drum A above the same; but it may, if more convenient, be formed separately therefrom and secured in any desired manner on the top or upper face of the drum A. Into this upper separator-drum A' is conducted the unskimmed milk, the separator-cylinder being in rapid rotation, and as the cream separates from the blue milk and forms the cream-wall it falls or descends over the inner margin of the partition $a^3$, separating the two chambers A' and A into the lower butter-separating chamber A, where, as the operation progresses, the butter globules are still more compacted and separated from the blue milk, always present in the cream, and form in a wall or stratum on the inner surface of the revolving volume therein. The blue milk to be used for converting the cream into the solid butter is conveyed from the upper cream-separator chamber A' by means of tubes $a\ a$, which open at their upper ends $a^2$ near the outer wall of the same, and are bent downward at their inner ends over the partition $a^3$ into the lower chamber or compartment A, to the bottom of which they are fixed at their lower ends. In the outer sides of these tubes $a\ a$, or those sides thereof which face the cream-wall or wall of butter globules in the lower chamber A, are formed a series of jet-apertures $a'$ similar to those of the tube $a$ in Fig. 1. When the apparatus is set in motion and the unskimmed milk conducted into the upper chamber A', the cream will be separated from the blue milk by centrifugal force and will form a cream-wall, which, as the volume of revolving liquid within said chamber A' increases, thickens and falls over the inner edge of the partition $a^3$, where it is again compacted and still further separated from the proportion of blue milk in which it is suspended, forming a second cream-wall. At the same time the blue milk, which will meanwhile have been put under considerable tension within the chamber A' by the outward pressure of the cream-wall from the centrifugal force, will be forced through the tubes $a\ a$ down into the lower chamber A, where it will be sprayed from the jet-apertures $a'$ against the cream-wall within said chamber A, as in the construction illustrated and described in Fig. 1. In the lower wall or bottom of the chamber A is a series of apertures $a^4$, down through which the butter will pass as soon as it is formed into a receiver $x$, placed below to receive it, while the blue milk from the chamber A will pass off by way of an outlet $a^5$ into a receiver $y$ provided for it.

The construction illustrated in Fig. 4 differs from both of the preceding constructions in the features I will now describe. The cream and blue milk are previously separated, as in the former cases, and are fed separately to the apparatus, the cream to the drum A and the blue milk to an inner chamber $A^2$, mounted to rotate within said drum A. The shaft X of the drum A is hollow or tubular, and the shaft Y of the inner drum $A^2$ passes through the hollow of the same. On the end of this shaft Y is provided a pulley $m$, whereby the said shaft may be driven from a belt, and on the lower end of shaft X is also provided a pulley $n$, whereby said shaft may also be driven from a belt. The shaft X, being tubular, provides a suitable bearing for shaft Y, and is itself mounted to rotate in a bearing Z of any desired form. The two shafts X and Y are by means of their gearing driven in opposite directions, and thus, while the cream-wall is formed in the outer portion of the drum A by the action of the centrifugal force, the blue milk will also be put under tension by said force and will be sprayed out from the apertures $a'$, provided in the side of the chamber $A^2$, against said cream-wall in the outer chamber A. The force of the current of blue milk thrown from inner chamber $A^2$ by the centrifugal force will be augmented, as will be observed, by the impact produced by the particles or streams of blue milk coming in contact with the volume of fluid moving rapidly in an opposite direction. The butter will be formed in this case in the same manner as in the preceding cases, and may be removed by means of a skimming-pipe or other suitable device, while the blue milk will pass off at a suitable outlet provided for it in the wall of drum A.

Many other modifications of my apparatus and of my process may be made without departing materially from the nature of my invention. For example, instead of feeding separator cream and blue milk alternately through different outlets into the apparatus seen in Fig. 1, unskimmed milk may be fed under pressure to said apparatus through the jet-pipe, and a cream-wall thus established within the drum, and when this wall shall have been once established the butter globules will be caused to coalesce by the continued spraying of the unskimmed milk from the said jet-pipe which feeds the apparatus. This will make the process continuous.

So far I have referred to the use of fluids in liquid form for whipping the cream in the cream-wall; but by trials I have ascertained that air or other aeriform fluids will produce the same result when directed as a blast against the cream-wall in the form of a jet or jets.

The air or liquid may be in a single jet, thin and wide, or it may be in smaller jets arranged in a row. They may be directed upon the cream-wall in a single line or at several points within the circumference of the drum.

Having thus described my invention, I claim—

1. The improvement in the art of obtaining butter-fat from milk containing it, which consists in subjecting the milk to centrifugal action in a rapidly-revolving drum and simultaneously whipping the inner wall of said milk with a jet or spray of fluid, air, or indifferent gas forcibly projected outwardly against it, whereby the particles of fat in the milk are caused to come together, coalesce, and form a mass of butter, substantially as set forth.

2. The improvement in the art of obtaining butter-fat from milk containing it, which consists in subjecting the milk to centrifugal action in a rapidly-revolving drum, whereby that portion of the milk containing the major portion of the butter-fat is made to form an inner wall and simultaneously projecting outwardly against said wall jets of blue milk, whereby the butter particles are caused to come together, coalesce, and form a mass of butter, substantially as set forth.

3. The improvement in the art of obtaining butter-fat from milk containing it, which consists in subjecting the milk to centrifugal action in a rapidly-revolving drum, simultaneously whipping the inner wall of said milk with a jet or spray of fluid forcibly projected outwardly against it, whereby the butter particles are caused to coalesce and the blue-milk particles set free, removing the butter in a continuous manner as formed and removing the blue milk in a continuous manner as formed.

4. In an apparatus for separating butter-fat from milk, the combination, with an imperforate drum rotatively mounted on an upright axis and having an opening in its top, of a jet apparatus consisting of an upright tube which extends down into the drum nearly to the bottom thereof and is provided with perforations in its side opposite to the drum-axis, whereby a fluid admitted to the drum through said tube may be projected outward against the cream-wall in the drum, as set forth.

5. In an apparatus for separating butter-fat from milk, the combination, with a drum A, rotatively mounted on an upright axis and having an opening in its top and outlets for butter and blue milk at its bottom, of a separator-drum A', mounted on the top of the drum A and embracing the opening in the latter, and an upright jet-pipe a, leading from the upper drum down into the lower drum, said pipe having a row of perforations in the outer face of that portion thereof which is in the lower drum and having its receiving-end in the upper drum arranged near the outer wall of the same, whereby the blue milk from the upper drum is led down into the lower drum and discharged against the cream-wall in the same, substantially as set forth.

In witness whereof I have hereunto signed my name in the presence of two subscribing witnesses.

ERIK GUSTAF NICOLAUS SALENIUS.

Witnesses:
 NERE A. ELFWING,
 ERNST SVANGVIST.